United States Patent
Husted et al.

(10) Patent No.: US 6,891,496 B2
(45) Date of Patent: May 10, 2005

(54) METHOD AND APPARATUS FOR PHYSICAL LAYER RADAR PULSE DETECTION AND ESTIMATION

(75) Inventors: Paul Husted, Palo Alto, CA (US); William J. McFarland, Los Altos, CA (US); Xiaoru Zhang, Sunnyvale, CA (US); John Thompson, Union City, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 0 days.

(21) Appl. No.: 10/138,953

(22) Filed: May 3, 2002

(65) Prior Publication Data

US 2003/0214430 A1 Nov. 20, 2003

(51) Int. Cl.[7] .............................. G01S 13/86; H04B 1/10
(52) U.S. Cl. ......................... 342/57; 342/57; 342/159; 455/296
(58) Field of Search .................... 342/57, 159; 455/296, 455/226.2; 370/252, 913; 375/220, 254, 346

(56) References Cited

U.S. PATENT DOCUMENTS

| | | | |
|---|---|---|---|
| 3,660,844 A | | 5/1972 | Potter |
| 4,181,910 A | | 1/1980 | Hitterdal |
| H001005 H | * | 12/1991 | Gerlach ........................ 342/378 |
| 5,473,332 A | * | 12/1995 | James et al. .................. 342/159 |
| 5,657,326 A | | 8/1997 | Burns et al. |
| 5,933,420 A | | 8/1999 | Jaszewski et al. |
| 5,990,833 A | | 11/1999 | Ahlbom et al. |
| 6,351,502 B1 | | 2/2002 | Zargari |
| 2001/0039183 A1 | * | 11/2001 | Kobayashi et al. ........... 455/63 |
| 2002/0003488 A1 | | 1/2002 | Moshe et al. |
| 2003/0012313 A1 | * | 1/2003 | Husted et al. ............... 375/345 |

FOREIGN PATENT DOCUMENTS

| | | | | |
|---|---|---|---|---|
| EP | 0 856 970 | | 8/1998 | |
| GB | 2 347 055 | | 8/2000 | |
| JP | 2001237846 A | * | 8/2001 | ........... H04L/12/28 |
| JP | 2001237847 A | * | 8/2001 | ........... H04L/12/28 |

OTHER PUBLICATIONS

"Working document towards a preliminary draft new recommendation on Dynamic Frequency selection in 5GHz RLANS" Agenda and Minutes (Unconfirmed) IEEE 802 LMSC Executive Committee Meeting, Online! Dec. 3, 2001, http://www.ieee802.org/minutes/nov2001/MinutesFri11162001.pdf.

Kerry, et al. (2001) "Liaison Statement on the Compatibility between IEEE 802.11a and Radars in the Radiolocation and Radionavigation Service in the 5250–5350 MHz and 5470–5725 MHz Bands,"http://www.ieee802.org/Regulatory/Meeting_documents/2001_Jan/1081r28R–Liaison–Be.

* cited by examiner

Primary Examiner—John B. Sotomayor
Assistant Examiner—Isam Alsomiri
(74) Attorney, Agent, or Firm—Reed Smith LLP; John W. Carpenter

(57) ABSTRACT

Radar Pulse detection and radar signal length detection are used to detect and provide information for identifying radar signals. Pulse detection estimates a radar pulse size when it is too short for meaningful measurement. Pulse detection identifies a radar by identification of an in-band pulse without a communication or data packet encoded therein, or a communication error is detected with the in-band pulse. Signal length detection counts the length of a received signal after the received signal exceeds a radar threshold. The count identifies the received signal length upon drop of the power. The signal is identified as a radar when the power drops before a PHY error occurs, or when the power drop occurs after a PHY error and a delay time equivalent to the shortest radar signal. A radar signal is also identified upon a timeout wait for a power drop after a PHY error.

46 Claims, 6 Drawing Sheets

METHOD AND APPARATUS FOR PHYSICAL LAYER RADAR PULSE DETECTION AND ESTIMATION

CROSS REFERENCE TO RELATED APPLICATIONS

This invention claims is related to the following co-pending U.S. patent applications, which are incorporated herein by reference, in their entirety:

McFarland et al., application Ser. No. 09/963,217, entitled "METHOD AND SYSTEM FOR DETECTING FALSE PACKETS IN WIRELESS COMMUNICATIONS SYSTEMS," filed, Sep. 25, 2001;

U.S. patent application assigned to Atheros Communications entitled "RADAR DETECTION AND DYNAMIC FREQUENCY SELECTION FOR WIRELESS LOCAL AREA NETWORKS," and U.S. patent applications, Atheros Communications client ref nos. ATH-044 and ATH-045, each having AGC discussions.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates generally to data communications, and to a method and apparatus for identification of radar signals that may need to be avoided by the wireless system.

2. Discussion of Background

Wireless Local Area Network (WLAN) devices must coexist with radar in the 5 GHz frequency bands. Interference mitigation techniques are required to enable WLAN devices to share these frequency bands with radar systems. The general requirement is that the WLAN devices detect interference, identify the radar interfering sources, and avoid using the frequencies used by the radar. Dynamic Frequency Selection (DFS) is used as a spectrum sharing mechanism by certain standards committees that define rules dictating the use of the 5 GHz space. For example, the European Telecommunications Standards Institute (ETSI), which is involved in developing standards for Broadband Radio Access Networks (BRAN), requires that transceiver equipment for use in HIPERLAN (High Performance Radio Local Area Networks) employ DFS mechanisms to detect interference from other systems, notably radar systems. One goal is to provide a uniform spread of equipment loading across a number of channels, such as fourteen channels of 330 MHz each, or 255 MHz each for equipment used in bands 5470 MHz to 5725 MHz.

Present proposals from the ETSI BRAN committee provide various guidelines for radar detection. These include detecting and avoiding radar signals that only appear at a level above a certain pre-defined threshold, such as −62 dBm. In one implementation, detection is based on a simple algorithm to see whether there are any instances of signals above the −62 dBm threshold during a ten second startup listening period. Another proposed guideline is that detection during normal operation should be addressed by periodically suspending all network traffic and listening in startup mode for any instances of signals above the −62 dBm threshold level.

Along with guidelines proposed by the present standards committees, the radar and satellite industries increasingly expect 5 GHz WLAN devices to detect and avoid radar signals during normal operation.

However, the present proposed methods of radar detection and avoidance are generally insufficient, especially in view of increased network traffic in the 5 GHz radio spectrum and the need for increased bandwidth among WLAN devices. The WLAN devices will need to quickly detect and avoid radar that have, among others, critical military, meteorological, and navigational functions. Therefore, additional detection and avoidance techniques are needed.

However, regardless of the techniques utilized, an important aspect of any system is the ability to detect and distinguish radar signals from other traffic or interference that may also be present in the spectrum of the wireless device.

SUMMARY OF THE INVENTION

The present inventors have realized the need to be able to reliably detect radar signals and distinguish them from packet collisions and other noise in wireless systems. The present invention provides a device and method for analyzing received signals to determine characteristics (parameters) of the received signal. Preferably, the identified signal characteristics are forwarded to software or other electronics for processing to determine if the received signals are of a type that has priority in the band(s) which the signal was received, or, if the received signals are of a type which the wireless device should contend for the available spectrum. If the received signal has priority (e.g., commercial aviation, meteorological, law enforcement, military, or other specified radar and/or signal types), then, the wireless device(s) relinquish the spectrum. If the received signal is not one of the specified priority signals, the wireless device is free to relinquish or contend for the spectrum in whatever manner it deems appropriate.

The present invention is mainly intended to detect and analyze radar signals to determine their characteristics, and particularly those signals operating in a same spectrum as a wireless LAN (WLAN) (e.g., 5 GHz). However, the devices and processes of the present invention may be configured for detection and analysis of other signals without restriction as to signal type, frequency, or implementation (e.g., WAN, LAN, peer to peer, etc.).

In one embodiment, the present invention provides a method of radar pulse detection, comprising the steps of, detecting a coarse gain drop in a receiver caused by a received signal, determining if the received signal is a radar pulse, and asserting a radar error if a coarse gain drop if of the received signal is due to a radar pulse. In another embodiment the present invention provides a method of radar detection, comprising the steps of, detecting an incoming signal having a signal strength greater than a radar threshold, processing a physical layer of a communication contained in the incoming signal, and asserting a radar error if an error occurs in the physical layer processing.

Preferably, the methods are performed simultaneously and combined as a method of radar detection, comprising the steps of, performing radar pulse detection on an incoming signal, performing a radar length detection on the incoming signal, and forwarding results of the radar pulse detection and radar length detection to an analysis device.

The present invention may be embodied as a device for detecting radar signals, comprising, a signal strength detector configured to detect strength of received signals above a radar threshold, a communication processing device configured to perform processing on non-radar communication signals and assert error conditions if errors occur in the processing, a radar detector coupled to the signal strength detector and communication processing device and configured to assert a radar error if a received signal is above the radar threshold and a communications processing error occurs.

Portions of both the device and method may be conveniently implemented in programming on a general purpose computer, or networked computers, and certain results, status, or other data may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
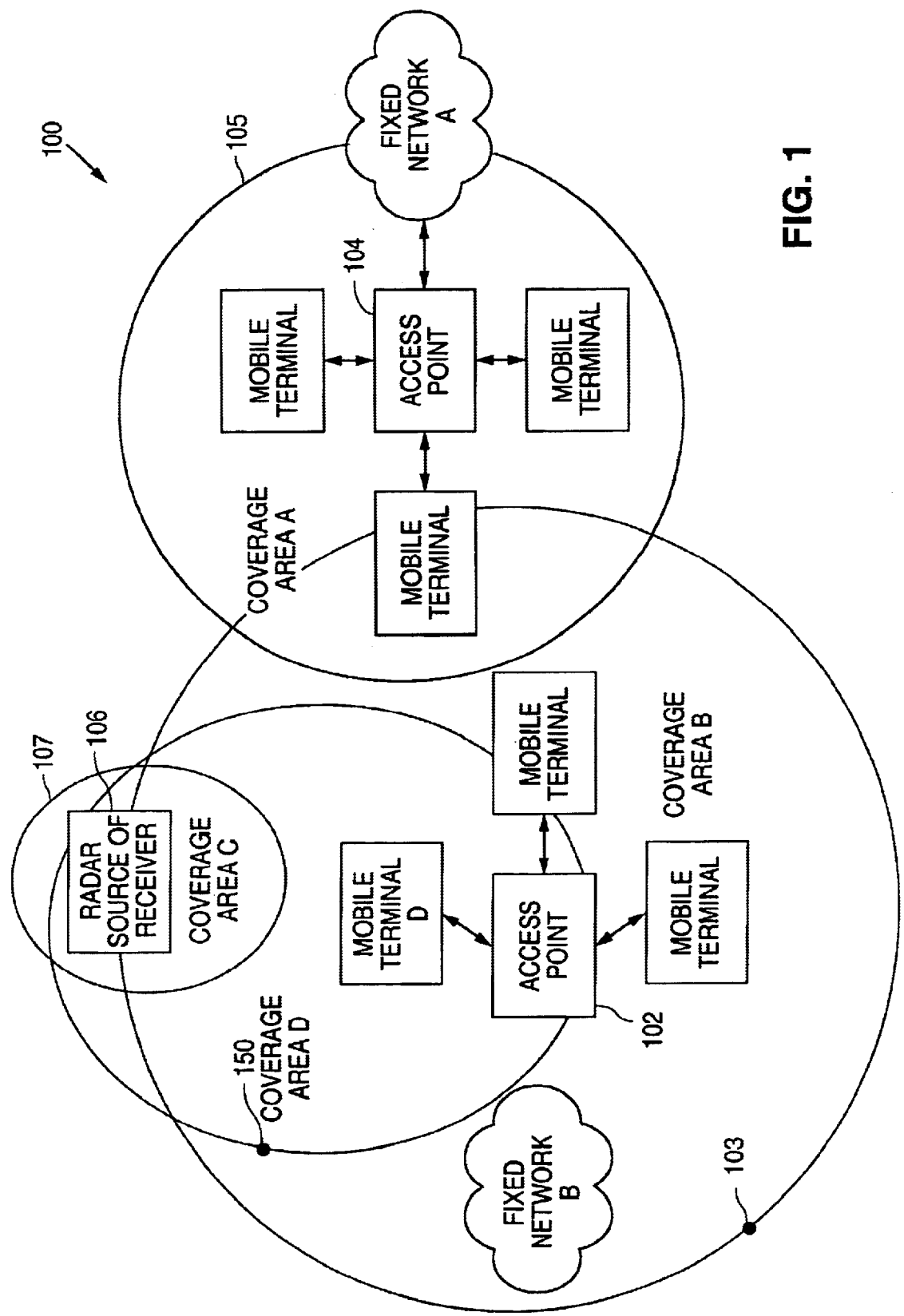
FIG. 1 is an illustration of an example wireless network in which the present invention is applied.

A radar detection system illustrative of the present invention is now described. For purposes of explanation, numerous specific details are set forth in order to provide a thorough understanding of the present invention. It will be evident, however, to one of ordinary skill in the art, that the present invention may be practiced without these specific details.

Various aspects of the present invention may be implemented within the hardware circuitry and/or software processes of a WLAN or Radio LAN (RLAN) device operating in the 5 GHz space. For purposes of the following discussion, the terms "Wireless LAN" and "Radio LAN" are used interchangeably to refer to a network for a device or devices that transmit in the 5 GHz space (e.g., IEEE 802.11a). Such a device could be an Access Point (AP), mobile terminal (node), or some other station within a greater wireless network. The wireless network device is configured to receive network traffic from other WLAN devices. However, the wireless network device can also receive unwanted signals from other sources, such as a radar source operating in the same frequency band(s). These signals may represent interference, or, may represent signals that must be avoided so that the wireless network device(s) do not interfere with them.

For example, ETSI currently promulgates a number of radar signals that must be avoided by a wireless device in order to be granted a license to operate in certain mostly unregulated portions of the spectrum. Table 1 provides an example listing of characteristics of ETSI identified radar signals:

TABLE 1

| Radar Types | Scan Type | Pulse Repetition Rate [pps] | Beam Width [degree] | Scan rate [degree/s] | Burst Duration[s] | Pulses per burst | Burst Period[s] | Pulse Width ($\mu s$) | Pulse Rise & Fall Times ($\mu s$) | Modulation |
|---|---|---|---|---|---|---|---|---|---|---|
| A - Meteorological, Ground/Ship | 360° | 50 | 0.65 | 0.65 | 1.0000 | 50 | 553.85 | 2 | 0.2 | N/A |
| A - Meteorological, Ground/Ship | 360° | 250 | 0.65 | 0.65 | 1.0000 | 250 | 553.85 | 2 | 0.2 | N/A |
| A - Meteorological, Ground/Ship | 360° | 1200 | 0.65 | 0.65 | 1.0000 | 1200 | 553.85 | 2 | 0.2 | N/A |
| C - Meteorological, Ground | 360° | 4000 | 0.95 | 0.00 | Cont. | Cont. | N/A | 0.05–18 | 0.005 | N/A |
| C - Meteorological, Ground | 360° | 4000 | 0.95 | 36.00 | 0.0264 | 106 | 10.00 | 0.05–18 | 0.005 | N/A |

TABLE 1-continued

| Radar Types | Scan Type | Pulse Repetition Rate [pps] | Beam Width [degree] | Scan rate [degree/s] | Burst Duration[s] | Pulses per burst | Burst Period[s] | Pulse Width (μs) | Pulse Rise & Fall Times (μs) | Modulation |
|---|---|---|---|---|---|---|---|---|---|---|
| E - Meteorological, Ground | 360° (cont. & sector) | 2000 | 0.55 | 21.00 | 0.0262 | 52 | 17.14 | 1.1 | 0.11 | N/A |
| E - Meteorological, Ground | 360° (cont. & sector) | 2000 | 0.55 | 24.00 | 0.0229 | 46 | 15.00 | 1.1 | 0.11 | N/A |
| E - Meteorological, Ground | 360° (cont. & sector) | 2000 | 0.4 | 21.00 | 0.0190 | 38 | 17.14 | 1.1 | 0.11 | N/A |
| E - Meteorological, Ground | 360° (cont. & sector) | 2000 | 0.4 | 24.00 | 0.0167 | 33 | 15.00 | 1.1 | 0.11 | N/A |
| F - Meteorological, Ground | 360° | 250 | 1 | 30.00 | 0.0333 | 8 | 12.00 | .8 to 2 | 0.08 | N/A |
| F - Meteorological, Ground | 360° | 1180 | 1 | 30.00 | 0.0333 | 39 | 12.00 | .8 to 2 | 0.08 | N/A |
| F - Meteorological, Ground | 360° | 250 | 1 | 48.00 | 0.0208 | 5 | 7.50 | .8 to 2 | 0.08 | N/A |
| F - Meteorological, Ground | 360° | 1180 | 1 | 48.00 | 0.0208 | 25 | 7.50 | .8 to 2 | 0.08 | N/A |
| F - Meteorological, Ground | 360° | 250 | 0.5 | 30.00 | 0.0167 | 4 | 12.00 | .8 to 2 | 0.08 | N/A |
| F - Meteorological, Ground | 360° | 1180 | 0.5 | 30.00 | 0.0167 | 20 | 12.00 | .8 to 2 | 0.08 | N/A |
| F - Meteorological, Ground | 360° | 250 | 0.5 | 48.00 | 0.0104 | 3 | 7.50 | .8 to 2 | 0.08 | N/A |
| F - Meteorological, Ground | 360° | 1180 | 0.5 | 48.00 | 0.0104 | 12 | 7.50 | .8 to 2 | 0.08 | N/A |
| G - Meteorological, Ground | 360° | 259 | 1.65 | 30.00 | 0.0550 | 14 | 12.00 | 3 | 0.03 | N/A |
| G - Meteorological, Ground | 360° | 259 | 1.65 | 48.00 | 0.0344 | 9 | 7.50 | 3 | 0.03 | N/A |
| H - Meteorological, Ground | 360° | 250 | 0.5 | 6.00 | 0.0833 | 21 | 60.00 | 0.8–5 | 0.2–2 | Conv. |
| H - Meteorological, Ground | 360° | 1200 | 0.5 | 6.00 | 0.0833 | 100 | 60.00 | 0.8–5 | 0.2–2 | Conv. |
| H - Meteorological, Ground | 360° | 250 | 0.5 | 18.00 | 0.0278 | 7 | 20.00 | 0.8–5 | 0.2–2 | Conv. |
| H - Meteorological, Ground | 360° | 1200 | 0.5 | 18.00 | 0.0278 | 33 | 20.00 | 0.8–5 | 0.2–2 | Conv. |
| H - Meteorological, Ground | 360° | 250 | 2 | 6.00 | 0.3333 | 83 | 60.00 | 0.8–5 | 0.2–2 | Conv. |
| H - Meteorological, Ground | 360° | 1200 | 2 | 6.00 | 0.3333 | 400 | 60.00 | 0.8–5 | 0.2–2 | Conv. |
| H - Meteorological, Ground | 360° | 250 | 2 | 18.00 | 0.1111 | 28 | 20.00 | 0.8–5 | 0.2–2 | Conv. |
| H - Meteorological, Ground | 360° | 1200 | 2 | 18.00 | 0.1111 | 133 | 20.00 | 0.8–5 | 0.2–2 | Conv. |
| I - Meteorological, Ground | 360° | 50 | 0.5 | 6.00 | 0.0833 | 4 | 60.00 | 0.8–5 | 0.2–2 | w/doppler capability |
| I - Meteorological, Ground | 360° | 1200 | 0.5 | 6.00 | 0.0833 | 100 | 60.00 | 0.8–5 | 0.2–2 | w/doppler capability |

TABLE 1-continued

| Radar Types | Scan Type | Pulse Repetition Rate [pps] | Beam Width [degree] | Scan rate [degree/s] | Burst Duration[s] | Pulses per burst | Burst Period[s] | Pulse Width ($\mu s$) | Pulse Rise & Fall Times ($\mu s$) | Modulation |
|---|---|---|---|---|---|---|---|---|---|---|
| I - Meteorological, Ground | 360° | 50 | 0.5 | 18.00 | 0.0278 | 1 | 20.00 | 0.8–5 | 0.2–2 | w/doppler capability |
| I - Meteorological, Ground | 360° | 1200 | 0.5 | 18.00 | 0.0278 | 33 | 20.00 | 0.8–5 | 0.2–2 | w/doppler capability |
| I - Meteorological, Ground | 360° | 50 | 2 | 6.00 | 0.3333 | 17 | 60.00 | 0.8–5 | 0.2–2 | w/doppler capability |
| I - Meteorological, Ground | 360° | 1200 | 2 | 6.00 | 0.3333 | 400 | 60.00 | 0.8–5 | 0.2–2 | w/doppler capability |
| I - Meteorological, Ground | 360° | 50 | 2 | 18.00 | 0.1111 | 6 | 20.00 | 0.8–5 | 0.2–2 | w/doppler capability |
| I - Meteorological, Ground | 360° | 1200 | 2 | 18.00 | 0.1111 | 133 | 20.00 | 0.8–5 | 0.2–2 | w/doppler capability |
| J - Meteorological, Ground | 360° | 100000 | 1.5 | 1.20 | 1.2500 | 125000 | 300.00 | 0.1 | 0.005 | w/doppler capability |
| J - Meteorological, Ground | 360° | 100000 | 12 | 1.20 | 10.0000 | ##### | 300.00 | 0.1 | 0.005 | w/doppler capability |
| K - Radionav Instrumentation, Ground | Tracking | 3000 | 2.5 | N/A | Cont. | N/A | N/A | 1 | 0.1/0.2 | N/A |
| L - Radionav Instrumentation, Ground | Tracking | 160 to 640 | 0.4 | N/A | Cont. | N/A | N/A | 0.25, 1.0, 5.0 | 0.02–0.5 | None |
| M - Radionav Instrumentation, Ground | Tracking | 160 to 640 | 0.8 | N/A | Cont. | N/A | N/A | 0.25, 0.5, 1.0 | 0.02–0.5 | None |
| N - Radionav Instrumentation, Ground | Tracking | 20 to 1280 | 1 | N/A | Cont. | N/A | N/A | 0.25–1 plain, 3.1–50 chirp | 0.02–0.1 | Pulse/chip pulse |
| O - Radionav Instrumentation, Ground | Tracking | 320 | 1 | N/A | Cont. | N/A | N/A | 100 | 0.5 | Chirp pulse |
| P - Radionav Surface & Air Search, Ship | 360° | 500 | 2.6 | 36.00 | 0.0722 | 36 | 10.00 | 20 | 0.5 | Linear FM |
| P - Radionav Surface & Air Search, Ship | 360° | 500 | 2.6 | 72.00 | 0.0361 | 18 | 5.00 | 20 | 0.5 | Linear FM |
| Q - Radionav Surface & Air Search, Ship | 30° Sector | 2400 | 1.6 | 90.00 | 0.0178 | 43 | 0.33 | 0.1/0.2 5/1.0 | 0.03/0.05/0.1 | None |
| Q - Radionav Surface & Air Search, Ship | 30° Sector | 1200 | 1.6 | 90.00 | 0.0178 | 21 | 0.33 | 0.1/0.2 5/1.0 | 0.03/0.05/0.1 | None |
| Q - Radionav Surface & Air Search, Ship | 30° Sector | 750 | 1.6 | 90.00 | 0.0178 | 13 | 0.33 | 0.1/0.2 5/1.0 | 0.03/0.05/0.1 | None |
| Q - Radionav Surface & Air Search, Ship | 270° Sector | 2400 | 1.6 | 90.00 | 0.0178 | 43 | 3.00 | 0.1/0.2 5/1.0 | 0.03/0.05/0.1 | None |
| Q - Radionav Surface & Air Search, Ship | 270° Sector | 1200 | 1.6 | 90.00 | 0.0178 | 21 | 3.00 | 0.1/0.2 5/1.0 | 0.03/0.05/0.1 | None |
| Q - Radionav Surface & Air Search, Ship | 270° Sector | 750 | 1.6 | 90.00 | 0.0178 | 13 | 3.00 | 0.1/0.2 5/1.0 | 0.03/0.05/0.1 | None |
| R - Research & Earth Imaging, Airborne | Fixed L or R of flight path | 1000–4000 | 3 | N/A | Cont. | N/A | N/A | 7 or 8 | 0.5 | Non-Linear/Linear FM |
| S - Search, Airborne | Cont. | 200 | 2 | 20.00 | 0.1000 | 20 | 18.00 | 1 | 0.05 | CW Pulse |
| S - Search, Airborne | Cont. | 1500 | 2 | 20.00 | 0.1000 | 150 | 18.00 | 1 | 0.05 | CW Pulse |

TABLE 1-continued

| Radar Types | Scan Type | Pulse Repetition Rate [pps] | Beam Width [degree] | Scan rate [degree/s] | Burst Duration[s] | Pulses per burst | Burst Period[s] | Pulse Width (µs) | Pulse Rise & Fall Times (µs) | Modulation |
|---|---|---|---|---|---|---|---|---|---|---|
| S - Search, Airborne | Cont. | 200 | 4 | 20.00 | 0.2000 | 40 | 18.00 | 1 | 0.05 | CW Pulse |
| S - Search, Airborne | Cont. | 1500 | 4 | 20.00 | 0.2000 | 300 | 18.00 | 1 | 0.05 | CW Pulse |

For Scanning Radars:
Burst Duration[s] = Beam Width/Scan Rate
Pulses per burst = Pulse Rep. Rate* Burst Duration
Burst Period[s] = 360/Scan Rate
Cont. = Continuous
Conv. = Conventional The characteristics of radar types identified in Table 1 provide identifying data that may be utilized to recognize certain radar signals. As it can be seen from the table, a number of radar sources need to be identified so that a wireless network device (or any wireless device) operating in that spectrum may take corrective action so as not to interfere with the priority signal (each ETSI identified signal is, for example, a priority signal).

Referring now to the drawings, wherein like reference numerals designate identical or corresponding parts, and more particularly to FIG. 1 thereof, there is an illustration of an example wireless network 100 in which the present invention is applied. FIG. 1 illustrates a coverage area overlap and interference problems associated with a WLAN system. In network 100, two independent sub-networks 103 and 105 are installed near to each other. Within their respective coverage areas, access points (AP) 102 (in sub-network 103) and 104 (in sub-network 105) each provide access to a fixed network such as an Ethernet LAN or an IEEE 1394 network. Each sub-network 103 and 105 also includes a number of mobile terminals (MT) (e.g. MT-D) wirelessly coupled to their respective network access points. Each mobile terminal can associate and dissociate with access points in the radio coverage area. The two radio coverage areas A and B are shown to overlap, thus illustrating the possibility of interference between the WLAN devices (mobile terminals and/or access points) in the coverage areas. The fixed networks for the access points are in general not the same, but may be coupled via a WAN, such as the Internet, or other communications link to allow coordination between the two independent coverage areas. Digital Frequency Selection (DFS) within each independent wireless network may be used to control the radio frequency to allow independent WLANs to coexist in overlapping zones. DFS techniques allow each access point to choose a frequency with sufficiently low interference; and other mechanisms, such as Transmission Power Control (TPC), reduces the range of interference from terminals, increasing spectral efficiency via more frequent channel re-use within a given geographic area.

As illustrated in FIG. 1, a radar system comprising a radar source and receiver 106 operating in coverage area C 107 may also overlap one or more of the coverage areas operated by an access point. The radar source could be a fixed radar source, such as a radar transmitter, or it could be a mobile radar source, such as a weather radar installed in an airplane. The overlap between coverage area C 107 and coverage area B 103 illustrates potential WLAN traffic interference with radar signal reception at the radar source and receiver 106.

In one embodiment of the present invention, access point 102 includes a radar detection and avoidance system that enables the WLAN system 103 to detect the radar signals, identify the radar source 106 (e.g., via a signature, profile, or other analysis), and switch to a channel that the radar interference is not using.

Radar Detection Method

For network 100, in FIG. 1, access point 102 includes a radar detection system that detects the presence of radar signals that have priority over access point 102 communications. In this example system, it is assumed that the access point equipment and mobile terminals operate in the frequency ranges of 5.15 GHz to 5.35 GHz. This frequency range is generally divided into ten channels of 20 MHz each. Of these, typically eight are available for use by the access point. However, it should be understood that the present invention may be applied to other frequency ranges and devices. Upon initialization, for a given channel, the access point WLAN device tests for radar signals in the given channel and, if detected, switches to another channel, until it finds a channel free of radar signal traffic. In some cases, the neighboring channels are also tested and are required to be free of certain radar signals. For example, some radiolocation systems have bandwidth greater than one 802.11a channel. All of which allows the dynamic selection of frequencies within the 5 GHz frequency space to avoid interfering with the priority radar sources. Furthermore, during operation, events indicating a radar event, such as a mobile radar entering a coverage area of the wireless network, are detected and continued operations of the wireless network are moved to a channel not occupied by the radar. Still further, each mobile device has its own coverage area (e.g., see mobile terminal D and its associated coverage area D 150), and the mobile devices themselves may also be configured to also detect radar events and initiate channel movement so as to not interfere with the radar.

In order to change frequencies when required, an important step is recognition of the radar signal. The present invention evaluates incoming signals to detect whether or not the received signal is a radar (or possibly another type of high priority signal). If the received signal is a radar, the characteristics of the received signal are sent to a processing device to determine if the radar signal is a signal that has priority for the channel. The detection of radar signals can occur on channels currently in use by a wireless device, channels that are intended to be used by a wireless device, or as a scanning device to determine an amount or character of radar traffic in a particular airspace. Thus, among other possible implementations, the present invention may be applied in a wireless device that avoids radar traffic on channels it is using or intends to use, and in monitoring devices that warn or otherwise provide information about radar signals within a vicinity or airspace being monitored (e.g., radar warning in combat aircraft, or automobiles, for example).

Figure 2:
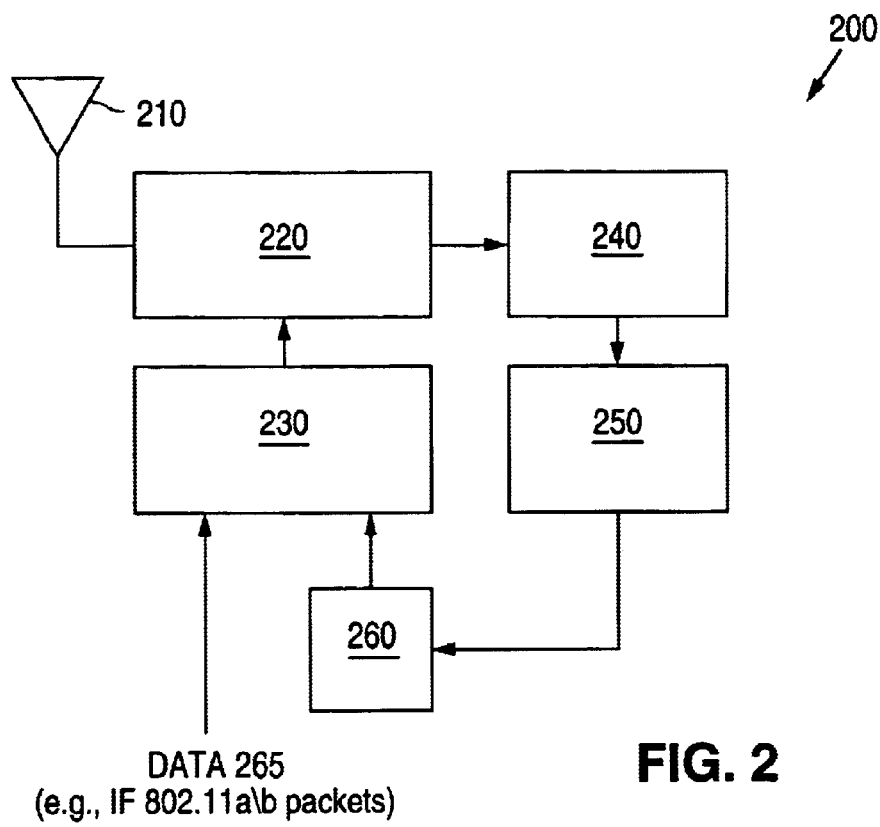
FIG. 2 is a block diagram of a radar detection device according to an embodiment of the present invention.

FIG. 2 is a block diagram of a radar detection device according to an embodiment of the present invention. In this example, the detection is part of a wireless communication device 200. The wireless communications device 200 transmits and receives wireless communications using RF wireless components (some of which are not shown for clarity), including components needed to implement radar detection according to the present invention. When the wireless device 200 is transmitting, an RF generator 230 generates RF signals (e.g., mixing an RF carrier frequency with IF frequency data 265). The RF signals are forwarded to the front end 220 for power amplification and then broadcast on antenna 210. A transmit receive switch directs the signals to be broadcast to the power amplifier and/or antenna. When the wireless device is receiving, antenna 210 receives incoming signals for which it is tuned (e.g., 5 GHz space). The front end 220 amplifies received signals (e.g., LNA) to boost signal strength. Many other arrangements of switches, amplifiers, antennas, etc. may be utilized.

The received signals are forwarded to a detector that processes the received signals to detect if they are radar. If the signals are radar, characteristics (parameters) of the received signal are forwarded to an analysis device 250 that determines if the radar should be avoided (e.g., the wireless device 200 needs to change channels). If the characteristics of the received signal cannot be affirmatively determined, estimates are produced and similarly forwarded. Thus the detector 240 provides an important step in identifying radar signals by first detecting that the received signals are radar.

The analysis device 250 includes programming or logic to identify or estimate priority signals and informs a tuner 260 to change the RF frequency. The tuner then acts to change the frequency of the RF signal produced by the RF generator 230.

Alternatively, the analysis device 250 sends a control signal to an alert device that produces an audio and/or visual warning signal to an operator (e.g., radar warning). In another alternative, the analysis device sends a message that is interpreted and displayed on a screen (e.g., a sweep radar style screen that identifies radar sources). In yet another alternative, a message (e.g., containing data about the detected radar) is sent to a database program that maintains a record of the traffic detected.

Figure 3:
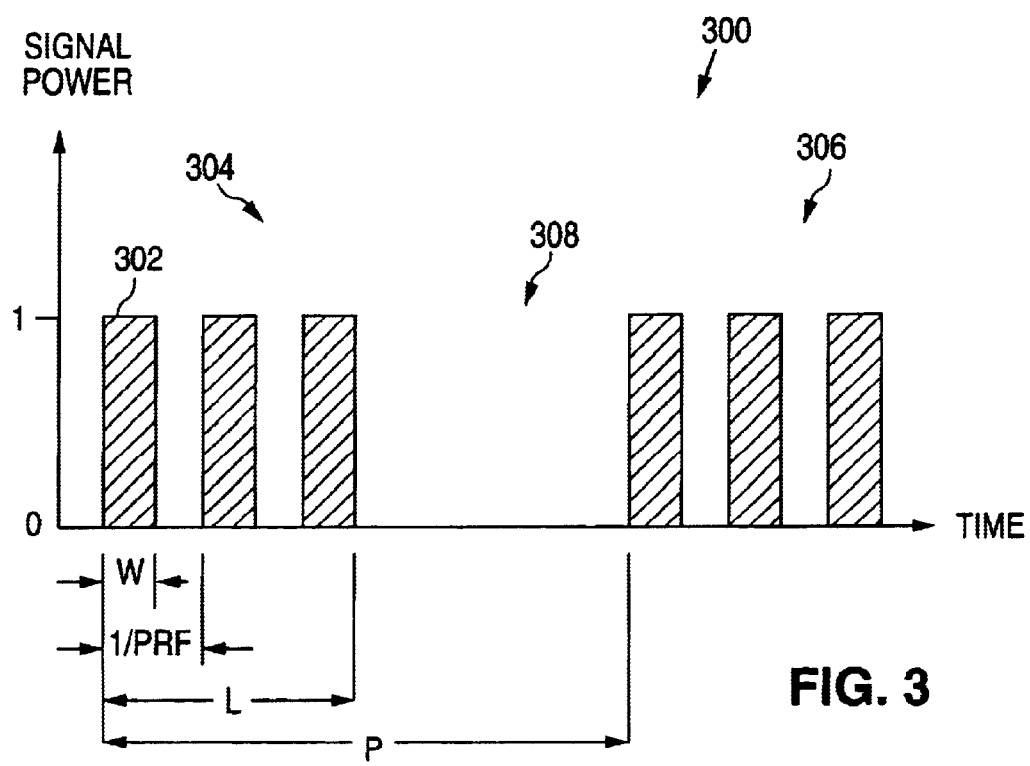
FIG. 3 is a graph of a typical radar signal that may be transmitted in a same frequency spectrum as a wireless network and/or appliances of the wireless network.

FIG. 3 is a detailed graph of a typical radar signal 300 that may be transmitted in a same frequency spectrum as a wireless network and/or appliances of the wireless network. The radar signal 300 is an example of the type of signal that may be broadcast by radar source 106 in FIG. 1, and consists of a series of pulses 302, transmitted in a series of bursts, such as first burst 304 and second burst 306. The bursts are separated by a gap 308. Each radar signal pulse 302 is a high-frequency (approximately 5 GHz) wave (e.g., sine wave, square wave, etc.), and has a pulse duration (W) of approximately one microsecond to five microseconds (see Table 1 for more precise examples). The pulse period is the time between the start of consecutive pulses and is the inverse of a pulse repetition frequency (PRF) of the signal. The pulse period is typically on the order of one millisecond. The burst length (L) refers to the number of pulses in a burst or the time duration associated with the burst of pulses. The burst interval (P) is the time from the start of one burst to the start of the next consecutive burst, and is on the order of one second to ten seconds.

In one embodiment of the present invention, the wireless communication device 200 of the access point listens for wireless LAN data packets. And, as described above, it is also configured to detect radar signals, such as illustrated in FIG. 3 while it is waiting to receive and respond to normal WLAN traffic. Upon detecting an event, the receiver analyzes the incoming signal to determine whether or not it is a regular WLAN packet. Various types of unrecognized events can be detected by the receiver. These include, noise fluctuations, collisions between WLAN stations or hidden nodes, co-channel interference, and other non-LAN wireless traffic, such as cordless phone transmissions, and the like.

As can be seen in FIG. 3, the typical radar signal possesses a degree of periodicity with respect to pulses and bursts. This characteristic is used by the receiver circuit 200 to differentiate noise and other types of anomalous (non-WLAN traffic) events from radar signals. Although noise may interfere and cause adverse effects on WLAN traffic, the access point need not be configured to strictly change channels when encountering noise, as opposed to radar, which may have priority for the channel. To properly identify the received non-WLAN signal as radar, the event is analyzed with respect to periodicity, pulse characteristics, burst characteristics, and other parameters in a pattern-matching type of process to determine whether the event is a radar signal (priority signal) or not. Different types of radar systems and sources possess different pulse and burst characteristics. The system could be configured to classify any type of periodic event as a radar signal, or it could be configured to identify, to a certain degree of specificity, the identity of the radar source using look-up tables or profile data provided by system operators.

The detector of the present invention provides a key determination on whether or not the received signals are radar, and, the analysis device then provides the final determination on whether or not the radar needs to be avoided or if the channel may be contended for by the WLAN device. Generally, information about the shape of the radar waveforms is not available, and only information such as that provided in Table 1 is used to distinguish noise and other traffic from the radar signals. Upon reception of a signal, the detector gathers information about the signal. For example, the detector determines the duration of the pulse, the magnitude of the pulse, and the separation of the pulse (e.g., via a time stamp). The detector also excludes certain signals by identifying the signal as part of another class of signals (e.g., IEEE 802.11a packets). The gathered information on the radar pulse is sent to the analysis device or software to attempt to establish the periodicity and the identity of the signals.

False detects will occasionally occur because there is going to be noise that accidentally triggers the detection and analysis when the noise looks like a radar pulse having the characteristics which are being tested for. However, in normal operation, the system will accurately identify radar. For example, if the detector examines 23 pulses that are of a particular width and height, and separated by a particular length of time which is consistent with a predetermined radar, then the analysis device can find that pattern and affirmatively assert that a radar has been found. Thus, the present invention provides a method and device that gathers the pieces of information needed to identify a radar signal, without knowledge as to the actual shape of the radar signal waveform. That information is then forwarded for further processing and identification.

One of the problems with detecting radar signals from other traffic is that they can be on the order of fractions of a micro-second in duration, which is a very short time frame in which to acquire and determine signal characteristics. Of particular importance is to properly size the signal within an Analog to Digital Converter (ADC) so that the signal can be further evaluated. A gain control device, such as an Automatic Gain Control (AGC) is utilized to size the incoming signal. Cost effective AGCs can be produced having about 30 dB of dynamic range. However, there can be a fairly large difference in signal strengths between wireless LAN devices and radar signals. Therefore, if a signal, such as a radar signal, is received that is significantly larger than what the AGC was previously controlling (e.g., typical WLAN signals), the AGC has a significant amount of gain re-calibration (gain change) to perform in order to be able to effectively size the incoming signal. Unfortunately, there is a time penalty for making AGC gain adjustments, and, considering the short length of time that the radar pulses are being received, often by the time the gain would have been adjusted properly, the signal is gone.

In one embodiment, the present invention divides the tasks of information gathering into two parts, pulse detection and signal strength threshold detection. A pulse detection mechanism is provided for measuring and reporting that a signal came that was shorter than an amount of time needed by the AGC to properly size the incoming signal (generally, a couple micro seconds). The incoming signal (e.g., pulses 304) appears as a single (or reduced) number of pulses, hence this task is referred to as pulse detection. The pulse detection mechanism uses the amount of gain adjustment achieved to determine (estimate) the power of the incoming signal. Performed concurrently with pulse detection, signal strength threshold detection, or signal length detection, is useful when the incoming signal is actually long enough for the gain to be sufficiently adjusted and then various characteristics of the incoming signal ca be properly measured.

Figure 4:
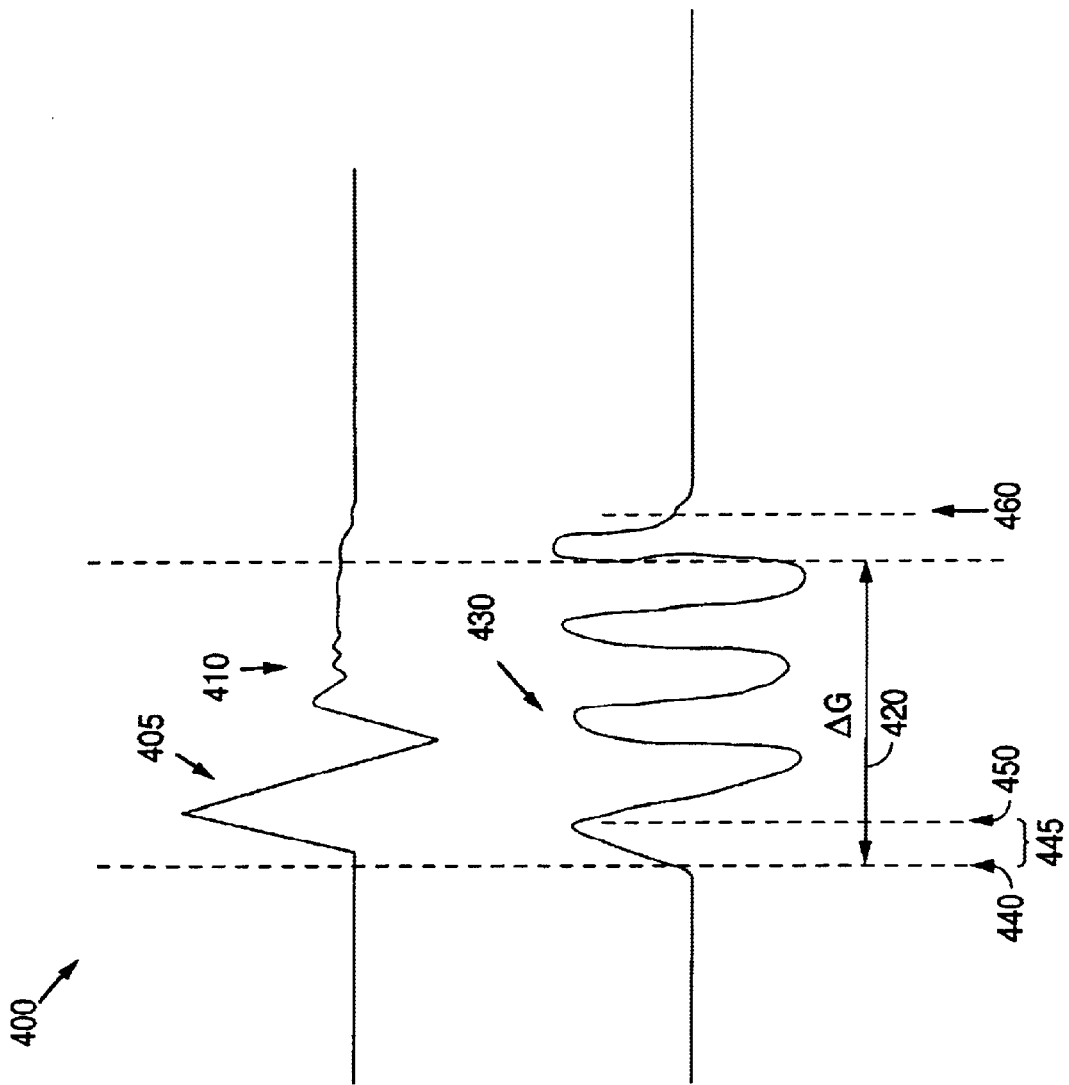
FIG. 4A is a graph of a short radar signal being detected by a wireless device configured according to an embodiment of the present invention.
FIG. 4B is a graph of a long radar signal being detected by a wireless device configured according to an embodiment of the present invention.

FIG. 4A is a graph of a radar signal 400 being detected by a wireless device configured according to an embodiment of the present invention. The radar signal include a set of one or more main pulses (main pulses 405), and a small amount of residual signal 410. An amount of time required to properly size the radar signal is illustrated as delta G 420. In the delta G time frame, the radar signal pulse has completed, effectively leaving no signal for measurement after gain adjustment.

Although a final gain adjustment which properly sizes the incoming signal is not accomplished in the case of FIG. 4A, during the timeframe delta G, a number of gain adjustments are accomplished while attempting to find the final proper gain adjustment. Each of these "intermediate" adjustments and data gathered regarding the incoming signal during the delta G timeframe provides information that is useful in estimating whether or not the incoming signal 400 is a radar. Good estimates can be achieved if the incoming signal lasts long enough for the AGC to make as few as 2 or 3 gain adjustments.

Figure 5:
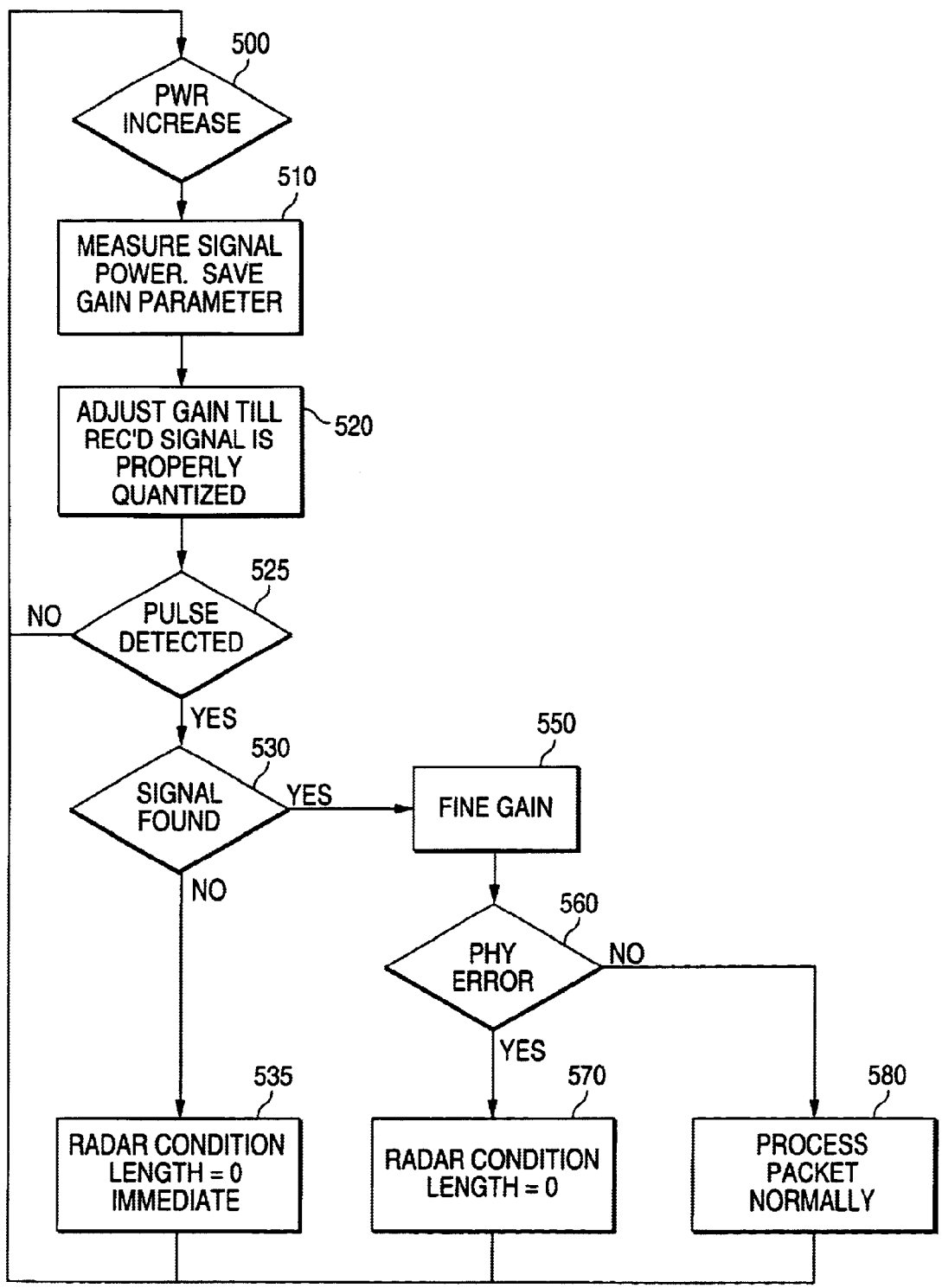
FIG. 5 is a flow chart of a radar pulse detection process according to an embodiment of the present invention.

FIG. 5 is a flow chart of a radar pulse detection process according to an embodiment of the present invention. A coarse gain drop at the AGC is an indication that an incoming signal is potentially a radar event. At step 500, the incoming signal is monitored for an increase in power (e.g., a pulse). In one embodiment, the increased power is indicated when the received signal goes out of a range of typical received signals. For example, average WLAN signals may be measured to determine a predetermined range of signal strengths and/or signal power. If the received signal exceeds that range, a coarse gain drop is triggered. Alternatively, a normally operating wireless device that encounters a 10–15 dB measured power increase in an ADC would also trigger a coarse gain drop. Gain adjustment, signal power, signal strength may be used individually or combined to trigger the coarse gain drop. In one embodiment, the range of signal strengths and/or amount of dB gain drop in the ADC is user or manufacturer programmable.

It is important to note that, whether measured directly, or indirectly, the present invention detects the arrival of an increase in power in the received signal. Preferably, small changes in signal size due to random noise fluctuation are tolerated, but then the gain is dropped if the power increases beyond a threshold. Therefore, instead of only detecting an AGC gain drop, the preferred trigger is an increase in quantized power at the ADC, detected at the same time as a drop in gain.

After detecting the increase in ADC power, the in-band power of the incoming signal is measured (step 510). The in-band power is measured to determine if the pulse was in-band. The in-band power is measured before the gain is adjusted so that the pulse is not lost (short pulse) while the gain change is being made. Therefore, the present invention determines that a coarse gain drop is to be made, but then waits for the signal to go through the latency of the FIR (or other device from which the power is measured), and then measures the power (e.g., firpwr16) to determine if the same samples causing the coarse gain drop determination are in-band or out-of-band. The power measurement may not be exact because the signal may be clipping at the ADC, but it will give data sufficient to at least estimate whether the signal was in-band or out-of-band.

The measurement of in-band signal power is performed, for example, by measuring power at an FIR filter or other mechanisms in the receiver. In addition the gain setting is saved for later comparison calculations.

The gain is then adjusted based on the measured signal power as normally occurs (step 520). With each gain adjustment the current gain setting becomes closer to an amount of gain needed to properly size the incoming signal. If the signal is very short, only one gain adjustment will be made, and then, because the signal is gone, the gain will be adjusted back to a level that is properly quantized (sized) for ambient noise in the band being received.

The measured power of the signal and gain parameters are used to determine if the received signal is a pulse (step 525). In one embodiment, a pulse is defined as an in-band signal having a maximum power greater than a radar pulse threshold, and, after the gain has been properly quantized, the received signal strength (RSSI) is less than the RSSI of the signal that caused the coarse gain drop. If no pulse is detected, the incoming signal is processed normally (move on to correlation and physical level tests) without asserting any radar conditions.

If a pulse has occurred, but a signal cannot be confirmed-, a radar condition (or error) is asserted with a length equal to zero because the pulse was too short to make a measurement. (step 535). The process then returns and waits for a next coarse gain drop.

Signal confirmation means the received signal appears to contain a non-radar communication consistent with the type of communication a device implementing the present invention expects to receive in the normal course of communications. However, preferably, the present invention does not have strict criteria for determining that the signal might be a normal communication, particularly with large and in-band signals which are sized correctly and then passed along the receiver chain as soon as possible. In these cases, phy errors (physical layer processing errors) in the receiver reject the packet if it isn't a normal communication.

If a signal is confirmed, fine gain changes are implemented (step 550), the signal is correlated, and the physical (PHY) layer of the incoming signal is tested (step 560). If an error occurs in the physical layer testing (PHY error), a radar condition is asserted at step 570 (again, length=0 because the pulse itself was too short to measure), otherwise, the incoming signal is processed as a normal WLAN packet (step 580).

In one embodiment, the number of gain adjustments made provides a length value that is also forwarded to the analysis device. Although gain adjustment counting is not a fully precise measurement technique, the data it provides can be used as evidence to help the analysis device make a decision on whether or not to assert a radar condition.

Table 2 provides an example set of pseudo code implementing a pulse detection process according to an embodiment of the present invention. As with all the pseudo code listings provided herein, this listing is not intended to be a compilable or executable section of code, but is intended as an example programming structure that may be utilized to implement a program consistent with the discussions herein.

TABLE 2

```
Detect coarse_gain_drop;
Delay long enough to measure firpwr16;
pulse_in_band = firpwr16 + const > adcpwr16;
record pulse_base_gain = total_gain;
change gain normally;
measure largest total gain drop from pulse_base_gain;
when signal_in_range
  pulse_detected =
    (pulse_in_band & (pulse_max_height >thresh) & . . .
        (rssi <pulse_rssi));
  signal_found = (flag_relpwr & (~enable_thr1a | rssi > thr1a));
  if pulse_detected
    if signal_found
      assert agc_done after fine gain change(s);
      if phy_error
        assert radar_err, length = 0;
      else
        proceed with packet normally;
      end
    else
      assert radar_err, length 0 immediately;
    end
  else
    proceed normally;
  end
end
``` coarse_gain_drop—~10 dB Gain drop in the AGC, other parameters may also indicate coarse gain drop (e.g., signal strength, signal power, etc.)

firpwr16—measured power in a received signal after band filtering.

const—an amount of signal power that accounts for in-band losses due to out-of-band signal filtering (e.g., FIR filtering).

adcpwr16—signal power measured from the ADC without band filtering.

pulse base gain—AGC gain setting upon initial receipt of a pulse.

total gain—Amount of gain used by the gain control mechanism (e.g., AGC).

signal in range—Gain control mechanism is properly quantized for the currently incoming signal (whether one or more of a radar, 802.11a preamble/packet, or ambient noise).

pulse in band—Identifies whether a received signal was in band or out of band (in band being the channel being monitored/used).

pulse max height—Largest measured power (or signal strength) of an incoming signal, measured as pulse_base_gain—min_gain_used, where min_gain_used is the smallest amount of total gain used in the system since pulse_base_gain was measured.

thresh—A predetermined value (threshold) for a minimum radar signal (e.g, signal strength or measured power).

rssi—An indication of received signal strength.

pulse rssi—Maximum threshold for RSSI, the RSSI must be under this value to allow it to be called a pulse (if other conditions are also true).

flag relpwr—A status indication of strong signal detection (e.g., in-band FIR power having a value similar to ADC power).

enable thr1a—A flag that enables an rssi threshold check.

thr1a—A signal threshold indicating a minimum amount of signal strength.

Preferably, each of the variables utilized, particularly the threshold values are programmable at either a manufacturing stage (set-up) of components in, or by an end user of (e.g., via a GUI or other interface), a device according to the present invention.

However, pulse detection is used as a worst case detection process (worst case being very short radar sequences that are difficult to measure). As a more reliable detection process, signal strength threshold detection is preferably performed simultaneously. In signal strength threshold detection, the length of the incoming signal is measured. The present invention takes advantage of the short radar signal length compared to typical wireless LAN signals. Referring back to Table 1, it can be seen that radar signal lengths vary, but are generally 100 micro seconds or less in length. Even the longest lengths are still much shorter than typical wireless LAN packets. In addition, regardless of length, processing a radar signal via normal wireless LAN processing will normally result in a physical level error (PHY error), which triggers the detector (e.g., detector 240) to indicate that a potential radar signal is being received. The gain remains at a same setting and the received power of the potential radar signal continues to be measured until it drops by a significant amount (e.g., a 10 dB drop in received power) indicating that the signal has stopped. The time span between initial reception of the signal and the received power drop is calculated as a duration which is then passed on to the analysis device 250.

FIG. 4B is a graph of a long radar signal 420 being detected by a wireless device configured according to an embodiment of the present invention. The long radar signal 430 is different from the radar pulse signal 400 because it is of longer duration. The longer duration provides the detector more time to gather information about the radar signal. The long radar signal 420 extends beyond the amount of time required for a gain control mechanism to properly size the incoming signal ($\Delta G$, 420)

Figure 6:
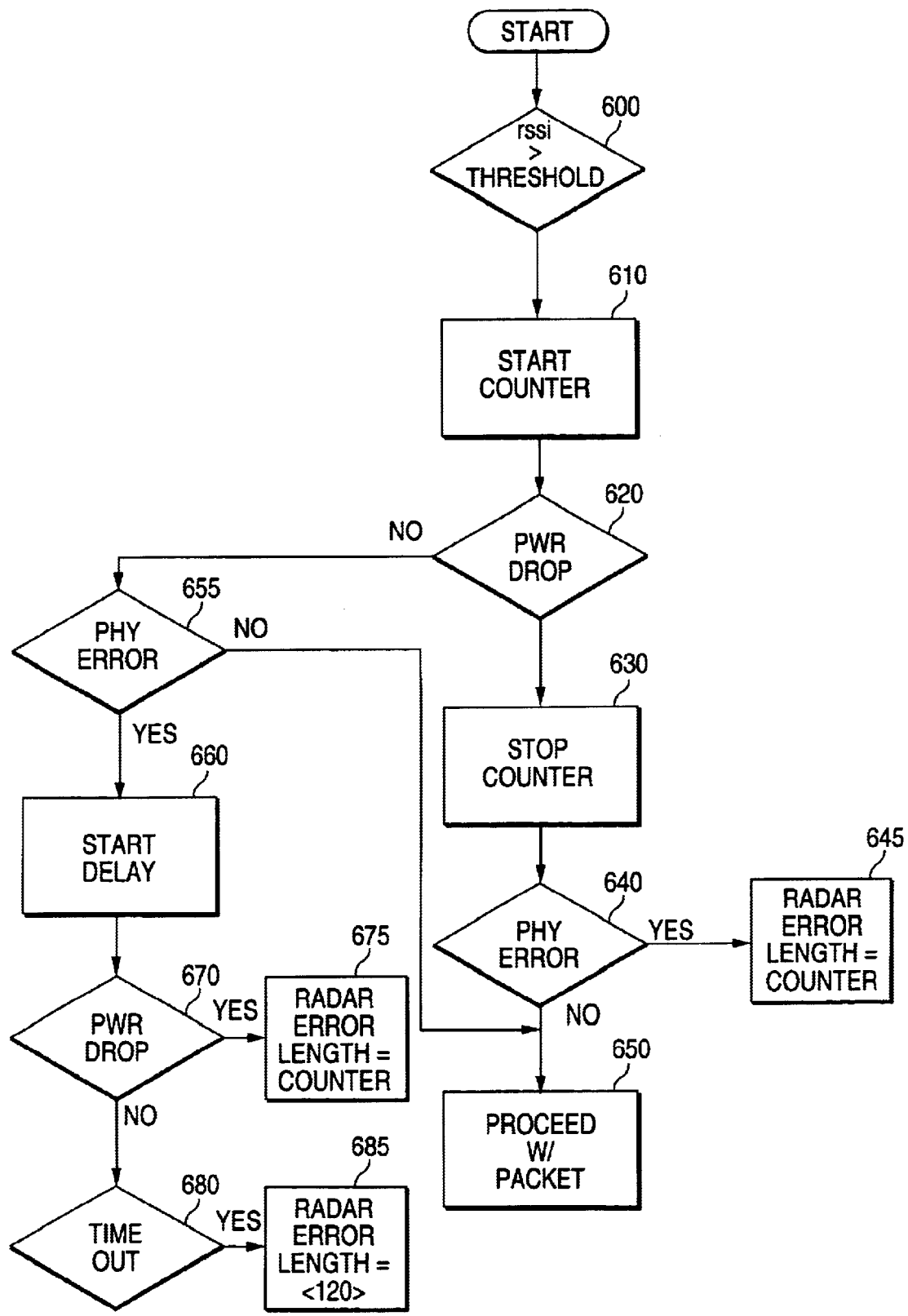
FIG. 6 is a flow chart of a radar signal strength threshold detection process according to an embodiment of the present invention.

FIG. 6 is a flow chart of a radar signal length detection process according to an embodiment of the present invention. The process is utilized when a received signal is long enough for a gain control mechanism to size the received signal. At step 600, a received signal strength (RSSI) is compared to a radar signal strength threshold. If the RSSI exceeds the radar signal strength threshold, then a counter is initialized (step 610).

Referring back to FIG. 4B, the counter is initialized at point 450. In one embodiment, the counter is initialized with a count value approximately equal to an amount of time (445) that represents time required to register RSSI, set the counter, or other factors that need to be accounted for in a timing indicated by the counter value. In other embodiments, the counter is initialized to zero and adjustments (if needed) are made at some point after the counter value is read.

If the RSSI drops significantly e.g., ~10 dB or other predetermined amount) (step 620), then the counter indicates a length of the incoming signal. At step 630, upon a substantial drop in RSSI (e.g., point 460), the counter is stopped. The counter value indicates the size of the signal (e.g., point 440 to just prior to point 460). If a phy error is detected (step 640), then a radar error is asserted with a length equivalent to the counter value (step 645). If no phy error occurs, which indicates a valid data communication, the incoming signal (e.g., an IEEE 802.11a packet) is processed normally (step 650).

A number of different mechanisms may be utilized to determine a phy error in the incoming signal. For example, preamble testing, self correlation of short sequences, signal field/data signal checks, transition to long sequences, self correlation of long sequences, parity checks, or testing certain allowable values for particular fields or lengths of fields. McFarland et al., application Ser. No. 09/963,217, entitled "METHOD AND SYSTEM FOR DETECTING FALSE PACKETS IN WIRELESS COMMUNICATIONS SYSTEMS," filed Sep. 25, 2001, the contents of which are incorporated herein by reference in its entirety, discloses a number of field and value checks that may be applied to physical level testing of incoming data packets.

Among other causes, phy errors occur because of a bad packet, packet collisions, no packet, and/or noise. However, a phy error combined with a large gain drop (e.g., 10 dB) indicates a radar signal. At step 645, each of these conditions has occurred, and a radar error is asserted and the length of the radar signal (e.g., counter value) is sent on the analysis device.

If no power drop occurs at step 620, and no PHY errors are encountered (step 655), a normal packet is being received and it is processed normally (step 650). However, if no power drop occurs initially (step 620), and a PHY error is encountered, then a radar signal is most likely being received.

At step 660, a delay is initiated. The delay is a wait period approximately equivalent to the longest known radar signal (or longest priority signal). Some additional wait time may be included in the wait period to account for system response. The delay period assures that an opportunity exists to detect a power drop in the radar signal even if the longest radar signal is being received. During the delay, if a power drop is detected (step 670), then a radar error is asserted and the counter value is sent on to the analysis device (step 657). If no power drop is detected, a time out of the delay period occurs (step 680), a radar condition is asserted with a default length which is passed on to the analysis device. The default length is, for example, a length greater than any of the known radars (or other code identifying default radar identification). The analysis device uses the information that a longer than known radar detection has occurred in its analysis to determine type of radar (or other signal) has been received. Table 3 is an example set of pseudo code implementing a signal length detection process according to an embodiment of the present invention:

TABLE 3

```
if rssi > radar_rssi_thresh
    initialize counter with consec_gainchanges
    if power_drops before phy_err
        stop counter
        if phy_err
            assert radar_err, length = counter
        else
            proceed w/ packet as normal
        end
    elseif phy_err before power_drops
        delay phy_err
        set temp_length = radar_max_len
        if power_drops
            assert radar_err, length = counter
        elseif timeout
            assert radar_err, length = radar_max_len
        end
    else (no phy_err)
        proceed normally w/ packet
    end
else
    proceed normally w/ packet
    report any errors normally & immediately
end
``` radar rssi thresh—predetermined threshold for a radar rssi.

consec gainchanges—Number of gain changes performed. (Longer radar detection—not pulse detection—the initial counter value takes into account time needed to measure signal and start the radar detection process.)

phy err—flag indicating an error has occurred in physical layer processing of the received signal.

temp length—default value of radar length to be asserted upon timeout waiting for gain drop.

radar max len—Maximum expected length of longest radar signal, plus some margin. The software should interpret receiving this value as a timeout to say that the power never dropped.

Figure 7:
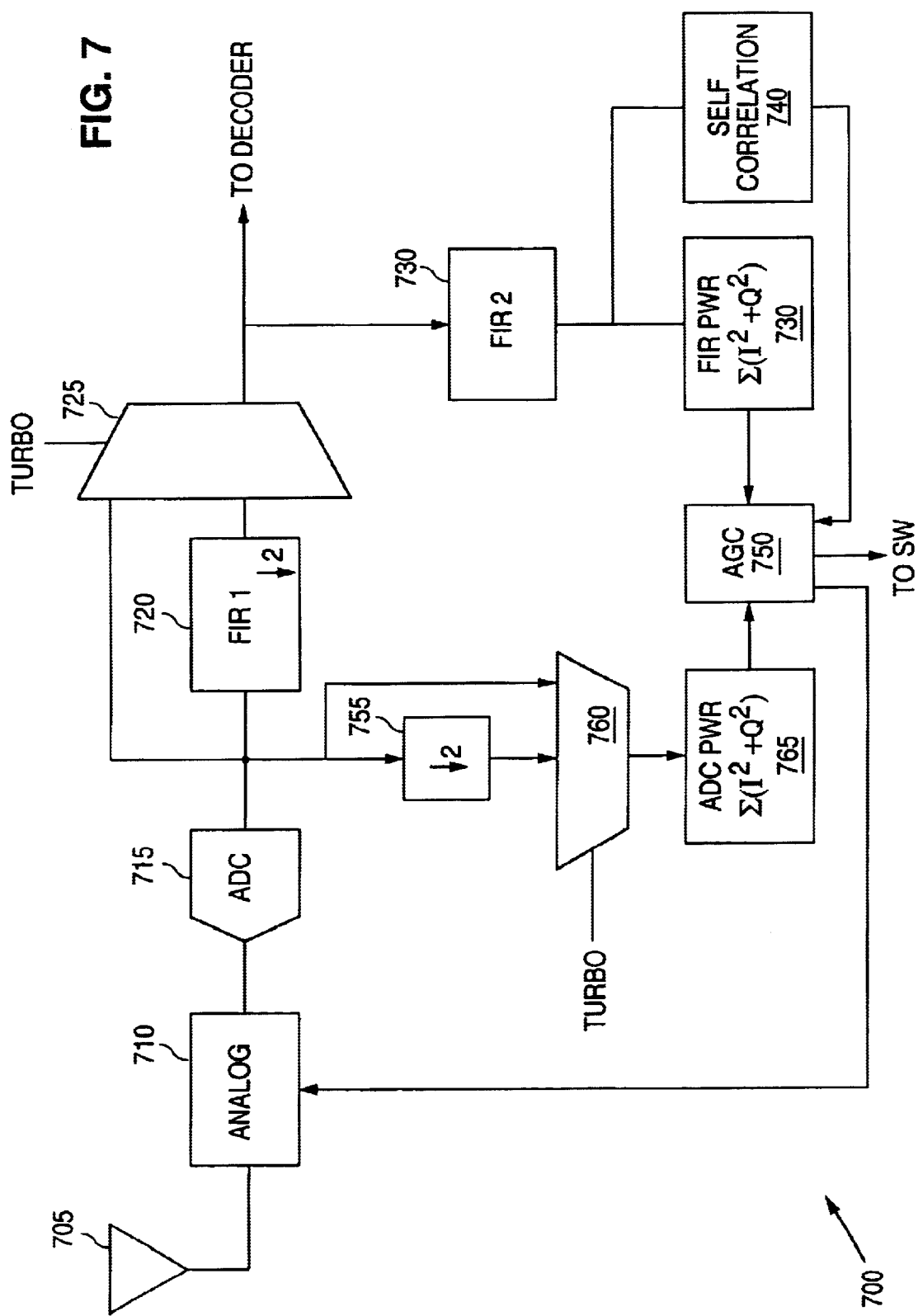
FIG. 7 is a circuit block diagram of a radar detection circuit according to an embodiment of the present invention.

FIG. 7 is a circuit block diagram of a radar detection circuit 700 according to an embodiment of the present invention. Antenna 705 is tuned, for example, to the 5 GHz band. Received signals are processed by an analog front end 710. The analog front end can be any arrangement of power amplifiers, LNA's or other devices known in the art. Some example implementations of RF front end devices are described in Zargari, U.S. Pat. No. 6,351,502, application Ser. No. 09/483,948, entitled "RF FRONT-END WITH MULTISTAGE STEPDOWN FILTERING ARCHITECTURE," filed Jan. 13, 2000, the contents of which are incorporated herein by reference in their entirety. Although not limited to these examples, the ordinarily skilled artisan will be capable of utilizing any one of the RF front end devices described in Zagari, or others, to work with the present invention.

Analog to digital converter (ADC) 715 digitizes the received signal as conditioned by the analog front end 710. The digital signal is then split for filtering (FIR 1 720) and decoding. The split signal has additional filtering (FIR 2 730). An amount of power of the filtered signal is calculated by power calculator 735. The power calculator 735 is, for example, a sum ($I^2+Q^2$) device. A power in the signal more directly from the ADC 715 is also calculated by power device 765. The ratio of filtered power (power calculator 735) vs. ADC power (power calculator 765) indicates if the signal is in-band (approximately equivalent ADC and FIR power indicates an in-band signal, while significant variations in ADC and FIR power indicate the signal may be spillover from a nearby band, which indicates a non in-band WLAN signal).

Automatic Gain Control (AGC) device 750 performs gain control on the analog front end 710. In one embodiment, the AGC also performs comparisons of the ADC power and FIR power and provides that information to the detection device for further processing as discussed elsewhere herein. Preferably, the detection device is implemented in software by a processor coupled to the AGC, but may also be implemented in hardware using integrated or discrete components alone or combined with other parts.

A self correlation unit 740 is also shown that performs correlation functions to synch up with incoming packets. Various embodiments of AGC and self-correlation may be utilized. Husted et al., entitled "IN-BAND AND OUT-OF-BAND SIGNAL DETECTION FOR AUTOMATIC GAIN CALIBRATION SYSTEMS," application Ser. No. 09/849,442, Client Docket No. ATH-044, filed May 4, 2001, and Husted et al. II, "SELF-CORRELATION DETECTION IN AUTOMATIC GAIN CALIBRATION," application Ser. No. 09/849,595, Client Docket No. ATH-045, filed May 4, 2001, the contents of which are incorporated herein by reference in their entirety, discuss a number of embodiments and processes for AGC and self-correlation that may be used in a device according to the present invention.

FIG. 7 includes downsamplers 755 and 720 (contained in FIR 1) that allow operation in different modes (here, configured for operation in standard mode or Atheros Turbo mode). Other modes of operation may also be accommodated with similar switching arrangements.

Although the present invention has been described herein with reference to radar signals and packet data communications, the devices and processes of the present invention may be applied to other types of signals and communication formats. In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a FIR device, any other equivalent device, such as a combination of high and low pass filters, or other mechanisms configured to have an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to AGC, counters (timers, etc), timestamps, processing devices, antennas, front ends, self-correlation devices, tuners, etc should also be consider in light of any and all available equivalents.

Furthermore, although the present invention is mainly intended to detect radar (or other) signals that should be avoided, other implementations of the technology described are also clearly practical. For example, avoiding signals in-band for performance reasons. In one embodiment, if sporadic non-11a traffic is in a first band and no traffic is in another band, the no traffic band is chosen to transmit in, even if the traffic signals didn't have priority in the first band.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification of received signal strength, adjusting gain, self-correlation, physical layer processing, asserting radar conditions and events (radar detection), and forwarding radar lengths, signal characteristics, and other radar indications to other modules for further processing, applying these processes to an entire system that identifies specific radar signals and changes channels of a wireless device operating on a same channel as the detected radar signal, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of radar pulse detection, comprising the steps of:
   detecting a size increase of a received signal;
   determining if the received signal is a radar pulse; and
   asserting a radar error if the received signal is a radar pulse;
   wherein said step of determining if the received signal is a pulse comprises the steps of:
   identifying the received signal as in-band pulse;
   comparing a max pulse height of the received signal to a radar pulse height threshold; and comparing a current signal strength to a threshold;
wherein the received signal is determined to be a radar pulse if it is in-band, has a pulse height greater than the radar pulse height threshold, and the current signal strength is significantly less than a signal strength threshold.

2. The method according to claim 1, wherein said step of identifying the received signal as in-band comprises the steps of:
calculating an amount of power in the received signal before filtering out-of-band signals from the received signal;
calculating an amount of power after filtering out-of-band signals from the received signals;
comparing the pre-filter and post-filter power values; and
declaring an in-band signal if the pre-filter and post-filter signals have approximately equivalent power values.

3. The method according to claim 2 wherein said step of declaring an in-band signal comprises declaring an in-band signal if the post-filter power value adjusted for in-band power loss due to filtering is approximately equivalent to the pre-filter power value.

4. The method according to claim 1 wherein:
said method is embodied in a set of computer instructions stored on a computer readable media;
said computer instructions, when loaded into a computer, cause the computer to perform the steps of said method.

5. The method according to claim 4, wherein said computer instruction are compiled computer instructions stored as an executable program on said computer readable media.

6. The method according to claim 1, wherein said method is embodied in a set of computer readable instructions stored in an electronic signal.

7. The method according to claim 1, wherein forwarding results comprises the steps of:
creating a message containing data about the detected radar; and
sending the message to a database.

8. A method of radar pulse detection, comprising the steps of:
detecting a size increase of a received signal;
determining if the received signal is a radar pulse;
asserting a radar error if the received signal is a radar pulse;
detecting indications of a communication contained in the received signal;
processing the detected communication; and
asserting a radar error if the communications processing fails.

9. The method according to claim 8, wherein said communications processing is physical level processing of the received signal.

10. The method according to claim 8, wherein said communications processing comprises testing allowable bit patterns within the communication.

11. The method according to claim 8, wherein said indications include at least a normalized self-correlation value greater than a predetermined threshold for periodic training sequences.

12. A method of radar pulse detection, comprising the steps of:
detecting a size increase of a received signal;
determining if the received signal is a radar pulse;
asserting a radar error if the received signal is a radar pulse; and
receiving the radar error at an analysis device that identifies whether the received signal is a priority signal.

13. A method of radar detection, comprising the steps of:
detecting an incoming signal having a signal strength greater than a radar threshold;
processing a physical layer of a communication contained in the incoming signal; and
asserting a radar error if an error occurs in the physical layer processing.

14. The method according to claim 13, further comprising the steps of:
starting a counter upon detection of the incoming signal;
setting a radar length field of the radar error to a value of the counter when the physical layer error occurs.

15. The method according to claim 14, further comprising the step of:
asserting the radar error with a length based on the counter value if the strength of the incoming signal drops below the radar threshold.

16. The method according to claim 13, further comprising the steps of:
starting a counter upon detection of the incoming signal;
delaying for a wait period;
wherein said step of asserting comprises,
asserting the radar error with a radar length field based on the counter value when the signal power drops below the radar threshold before the wait period expires, and
asserting the radar error with the radar length field equal to a default value if the signal power does not drop below the radar threshold before the wait period expires.

17. The method according to claim 16, wherein said wait period is a longest priority radar signal length.

18. The method according to claim 16, wherein said wait period is a longest radar signal length identified by European Telecommunications Standards Institute (ETSI) as a radar signal to be avoided by other wireless traffic.

19. The method according to claim 13, wherein:
said method is embodied in a set of computer instructions stored on a computer readable media;
said computer instructions, when loaded into a computer, cause the computer to perform the steps of said method.

20. The method according to claim 19, wherein said computer instruction are compiled computer instructions stored as an executable program on said computer readable media.

21. The method according to claim 13, wherein forwarding results comprises the steps of:
creating a message containing data about the detected radar; and
sending the message to a database.

22. A method of radar signal length detection, comprising the steps of:
detecting an incoming signal having a received signal strength greater than a radar threshold;
initializing a counter;
processing a physical layer of a communication contained in the incoming signal; and
if the received signal strength drops below a predetermined threshold before an error occurs in the physical layer processing, then,
stopping the counter, and
asserting a radar error with a length field based on a value of the counter.

23. The method according to claim 22, further comprising the steps of:
- if an error in the physical layer processing occurs without the received signal strength dropping below the predetermined threshold, then, delaying for a wait period; and
- if the received signal strength drops below the predetermined threshold, then asserting a radar error with a length based on the counter value when the received signal strength drops.

24. The method according to claim 23, further comprising the step of:
- if the received signal strength does not drop before a timeout, then asserting a radar error with a default length if the received signal strength drops after the wait period.

25. The method according to claim 22, wherein:
- said method is embodied in a set of computer instructions stored on a computer readable media;
- said computer instructions, when loaded into a computer, cause the computer to perform the steps of said method.

26. The method according to claim 25, wherein said computer instructions are compiled computer instructions stored as an executable program on said computer readable media.

27. The method according to claim 22, wherein said method is embodied in a set of computer readable instructions stored in an electronic signal.

28. A method of radar detection, comprising the steps of:
- performing radar pulse detection on whether an incoming signal is a radar;
- performing a radar length detection on the incoming signal; and
- forwarding results of the radar pulse detection and radar length detection to an analysis device;
- wherein pulse detection comprises the steps of:
- detecting a size increase in a receiver caused by a received signal;
- determining if the received signal is a radar pulse; and
- asserting a radar error if a coarse gain drop occurs at an AGC type device in the receiver and the received signal is a radar pulse.

29. The method according to claim 28, wherein:
- said steps are embodied in a set of compiled computer instructions stored on a computer readable media; and
- said compiled computer instructions, when loaded into a computer memory and executed, cause the computer to perform said steps.

30. A method of radar detection, comprising the steps of:
- performing radar pulse detection on whether an incoming signal is a radar;
- performing a radar length detection on the incoming signal; and
- forwarding results of the radar pulse detection and radar length detection to an analysis device;
- wherein said radar length detection comprises the steps of:
- detecting an incoming signal having a signal strength greater than a radar threshold;
- processing a physical layer of a communication contained in the incoming signal; and
- asserting a radar error if an error occurs in the physical layer processing.

31. The method according to claim 30, wherein said radar length detection comprises the steps of:
- measuring a length of a received signal determined to be a radar; and
- reporting the measured radar length to the analysis device.

32. The method according to claim 30, wherein:
- said steps are embodied in a set of compiled computer instructions stored on a computer readable media; and
- said compiled computer instructions, when loaded into a computer memory and executed, cause the computer to perform said steps.

33. A device for detecting radar signals, comprising:
- a signal strength detector configured to detect strength of received signals above a radar threshold;
- a communication processing device configured to perform processing on non-radar communication signals and assert error conditions if errors occur in the processing;
- a radar detection coupled to the signal strength detector and communication processing device and configured to assert a radar error if a received signal is above the radar threshold and a communications processing error occurs.

34. The device according to claim 33, wherein said communications processing is physical layer processing of wireless packets.

35. The device according to claim 33, wherein said radar threshold is based on a European Telecommunications Standards Institute (ETSI) Broadband Radio Access Networks (BRAN) identified signal strength.

36. The device according to claim 33, further comprising:
- a counter; and
- a control device configured to initialize the counter upon receipt of a received signal above the radar threshold.

37. The device according to claim 36, wherein the control device is further configured to set a radar length field based on the counter value when the communications processing error occurs.

38. The device according to claim 36, wherein the control device is further configured to set a radar length field based on the counter value when the received signal drops in strength after a communications processing error occurs.

39. The device according to claim 38, further comprising a delay mechanism configured to initiate a wait period during which the device waits for the received signal power to drop.

40. The device according to claim 36, wherein the control device is further configured to set a radar length field to a default value when the received signal does not drop in strength after the communications processing error occurs.

41. The device according to claim 36, further comprising:
- a pulse detector configured to determine if a received signal is a radar pulse;
- wherein the control device is further configured to set the radar length field to zero if a pulse is detected and a communications processing error occurs.

42. The device according to claim 36, further comprising:
- a pulse detector configured to determine if a received signal is a radar pulse;
- wherein:
- the communications processing device is further configured to detect at least indications of a communication contained within the received signal; and
- the control device is further configured to set the radar length field to zero if a pulse is detected and the communications processing device does not find at least indications of a communications packet in the received signal.

43. A method, comprising the steps of:

detecting a size increase of a received signal;

identifying the received signal as in-band pulse;

comparing a max pulse height of the received signal to a radar pulse height threshold;

comparing a current signal strength to a threshold; and asserting a radar error if the received signal is in-band, has a pulse height greater than the radar pulse height threshold, and the current signal strength is significantly less than a signal strength threshold.

44. The method according to claim 43, wherein said step of identifying the received signal as in-band comprises the steps of:

calculating an amount of power in the received signal before filtering out-of-band signals from the received signal;

calculating an amount of power after filtering out-of-band signals from the received signals;

comparing the pre-filter and post-filter power values; and declaring an in-band signal if the pre-filter and post-filter signals have approximately equivalent power values.

45. The method according to claim 44, wherein said step of declaring an in-band signal comprises declaring an in-band signal if the post-filter power value adjusted for in-band power loss due to filtering is approximately equivalent to the pre-filter power value.

46. The method according to claim 43, wherein:

said steps are embodied in a set of compiled computer instructions stored on a computer readable media; and said compiled computer instructions, when loaded into a computer memory and executed, cause the computer to perform said steps.

* * * * *